(12) United States Patent
Crockett et al.

(10) Patent No.: US 9,886,784 B2
(45) Date of Patent: Feb. 6, 2018

(54) SYSTEMS AND METHODS FOR RENDERING A MOSAIC IMAGE FEATURING PERSONS AND ASSOCIATED MESSAGES

(71) Applicant: Express Scripts, Inc., St. Louis, MO (US)

(72) Inventors: Charissa Crockett, Montclair, NJ (US); Mark Puzio, Oak Ridge, NJ (US); Brian F. Ezrow, Quakertown, PA (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 226 days.

(21) Appl. No.: 14/602,510

(22) Filed: Jan. 22, 2015

(65) Prior Publication Data

US 2015/0206333 A1 Jul. 23, 2015

Related U.S. Application Data

(60) Provisional application No. 61/930,459, filed on Jan. 22, 2014.

(51) Int. Cl.
*H04N 1/00* (2006.01)
*G06T 11/60* (2006.01)
(Continued)

(52) U.S. Cl.
CPC ............ *G06T 11/60* (2013.01); *G06F 3/0481* (2013.01); *G06F 17/211* (2013.01); *G06F 17/3089* (2013.01); *G06F 17/30247* (2013.01); *G06K 9/46* (2013.01); *G06T 7/10* (2017.01); *G06F 3/0482* (2013.01); *G06F 3/04842* (2013.01); *G06F 17/212* (2013.01); *G06F 17/30253* (2013.01); *G06F 17/30256* (2013.01);
(Continued)

(58) Field of Classification Search
CPC ............................. G06F 17/3089; G06T 11/60
USPC ........................................................ 715/202
See application file for complete search history.

(56) References Cited

U.S. PATENT DOCUMENTS 6,522,787 B1 2/2003 Kumar et al.
7,609,275 B2 10/2009 Kim et al.
(Continued)

OTHER PUBLICATIONS

Lazy Load Plugin for jQuery, http://www.appelsiini.net/projects/lazyload, website pulled on Jan. 21, 2015.

*Primary Examiner* — Cesar Paula
*Assistant Examiner* — Luu-Phuong Nguyen
(74) *Attorney, Agent, or Firm* — Husch Blackwell LLP

(57) ABSTRACT

Methods and systems for mosaic rendering are described. In some embodiments, an image featuring a person is received. A message associated with the person is received. A mosaic rendering scheme is modified to create a modified mosaic rendering scheme including the image based on receipt of the image and the message. A mosaic display is rendered including the image and the plurality of additional images based on the modified mosaic rendering scheme, the mosaic display including the image and the plurality of additional images in a display pattern in which each image is adjacent to at least one other image. A user inquiry is detected relative to the mosaic display in proximity to the image. A message display is generated including the message based on detection of the user inquiry. Additional methods and systems are disclosed.

20 Claims, 11 Drawing Sheets

(51) Int. Cl.
*G06F 17/30* (2006.01)
*G06T 7/10* (2017.01)
*G06F 3/0481* (2013.01)
*G06K 9/46* (2006.01)
*G06F 17/21* (2006.01)
*G06F 3/0484* (2013.01)
*G06F 3/0482* (2013.01)

(52) U.S. Cl.
CPC .... *G06F 17/30867* (2013.01); *G06T 2200/32* (2013.01); *G06T 2207/10004* (2013.01); *G06T 2207/10016* (2013.01)

(56) References Cited

U.S. PATENT DOCUMENTS

| | | | | |
|---|---|---|---|---|
| 8,484,564 B1* | 7/2013 | Marti | | G06Q 10/00 463/42 |
| 2008/0077595 A1* | 3/2008 | Leebow | | G06Q 10/10 |
| 2009/0064029 A1* | 3/2009 | Corkran | | G06F 3/0482 715/781 |
| 2010/0146450 A1* | 6/2010 | Harada | | G06F 17/30126 715/838 |
| 2011/0067087 A1* | 3/2011 | Thornton | | G06F 21/31 726/3 |
| 2011/0170800 A1 | 7/2011 | Curlander et al. | | |
| 2011/0243461 A1* | 10/2011 | Nayar | | G06K 9/00281 382/224 |
| 2012/0254790 A1* | 10/2012 | Colombino | | G06F 3/0482 715/781 |
| 2014/0038703 A1* | 2/2014 | Lampert | | G07F 17/329 463/26 |
| 2014/0046976 A1* | 2/2014 | Zhang | | G06F 17/30483 707/772 |
| 2014/0096018 A1* | 4/2014 | Iannucci | | G06F 3/0484 715/738 |
| 2014/0136999 A1* | 5/2014 | Leibovich | | H04N 7/157 715/753 |
| 2015/0149454 A1* | 5/2015 | Hieronymus | | G06K 9/6263 707/728 |
| 2015/0169170 A1* | 6/2015 | Beach | | G06F 3/04812 715/856 |

\* cited by examiner

FIGURE 11

SYSTEMS AND METHODS FOR RENDERING A MOSAIC IMAGE FEATURING PERSONS AND ASSOCIATED MESSAGES

CROSS-REFERENCE TO A RELATED APPLICATION

This application claims the benefit of U.S. provisional patent application 61/930,459 filed on 22 Jan. 2014, entitled "Systems and Methods for Mosaic Rendering", the entire disclosure of which is incorporated herein by reference.

FIELD

The field relates to imaging, and more particularly to methods and systems for rendering mosaic images.

BACKGROUND

Digital images featuring people and with associated backgrounds and/or objects may be captured by digital cameras or otherwise. These captured images may be viewed later by rendering the images on a wide variety of devices. Images may be viewed on such devices individually, sequentially, or otherwise.

BRIEF DESCRIPTION OF THE DRAWINGS

FIGS. 7-11 are are example displays, according to example embodiments; and

DETAILED DESCRIPTION

Example systems and methods for mosaic rendering are described. In the following description, for purposes of explanation, numerous specific details are set forth in order to provide a thorough understanding of example embodiments. It will be evident, however, to one of ordinary skill in the art that embodiments of the invention may be practiced without these specific details.

People of diverse backgrounds can bond together loosely or more formally for a variety of different purposes. For example, these people may be part of a club or organization, affiliated with a cause, be located in a geographic area, or otherwise be associated with or have a commonality with one another. Depending upon the person's relationship with the bonding entity (or other commonality) and/or others associated with the bonding entity, the person may feel more or less associated with the bonding entity and/or others than other people associated with the bonding entity.

One specific example of a bonding entity is a company. Companies have, and seek to have, diverse work forces for a variety of reasons. The diverse work force members may have joined the company with differing employment backgrounds, education backgrounds, differing ethic classifications, differing life experiences, differing world experiences, differing social-economic backgrounds, different personal health experiences, and the like. These work force members may be employed to work in a variety of different roles of the company. The work force members may feel differently about some members of the work force and/or the company relative to other members of the work force. For example, a work force member may relate much better to persons having a similar role within the organization or within a similar segment of the organization than with work force members having a different role or within a different segment of the organization.

In some embodiments, the methods and systems may be used to improve understanding, relationships, and/or impressions of members of the work force with other members of the work force and/or the organization itself. Images may be combined together in the form of a mosaic that provides for certain types of user interactivity through a web browser or the like. In some embodiments, rendering of a mosaic image featuring work force members and associated messages may effectuate such improvements.

Figure 1:
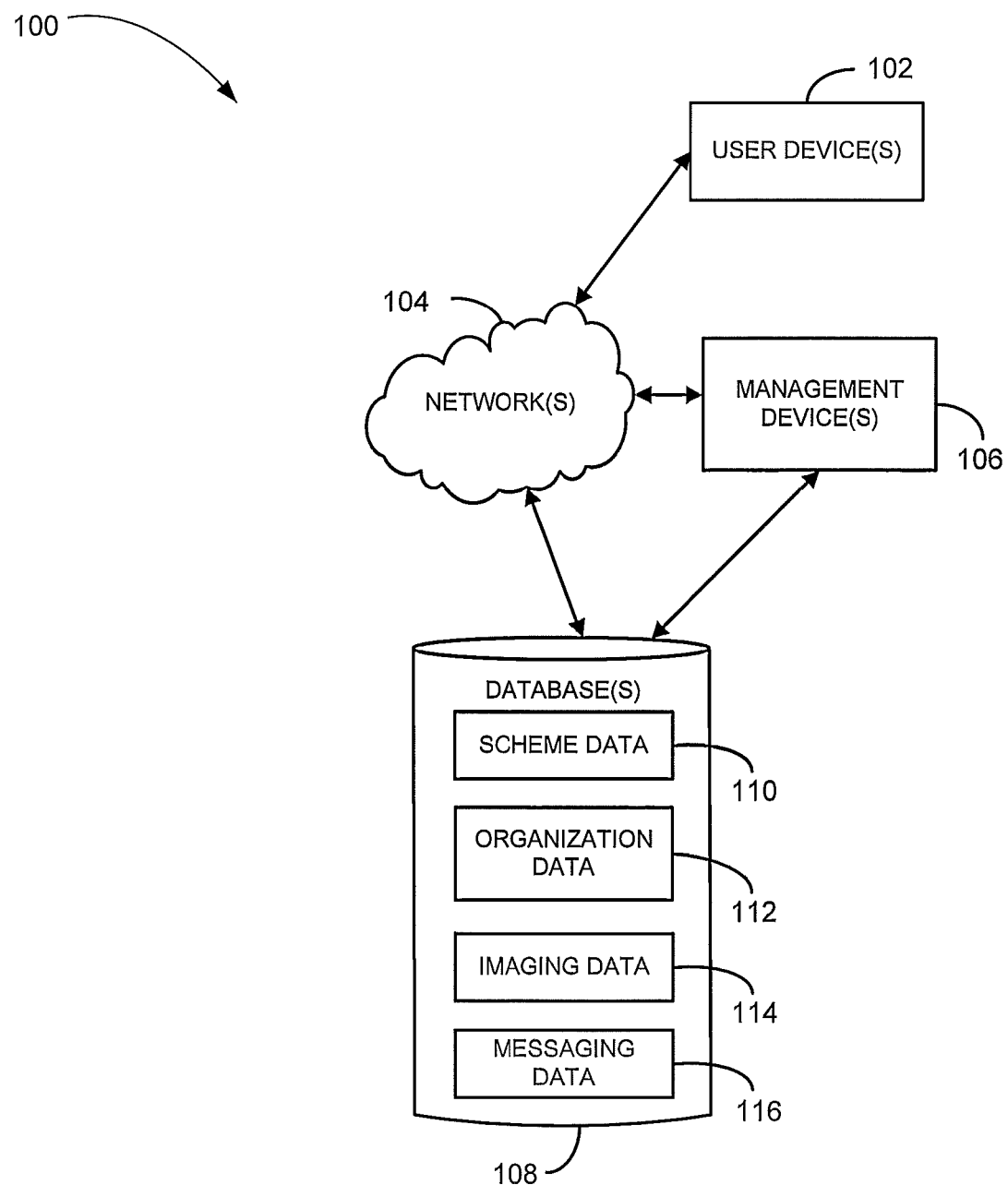
FIG. 1 is a block diagram of an example system according to an example embodiment.

FIG. 1 is a block diagram of an example system 100, according to an example embodiment. The system 100 is an example embodiment in which mosaic rendering may be performed. The system 100 includes a user device 102 in communication with a management device 106 over a network 104.

The user device 102 is a device used by a device operator. The device operator may be a user that seeks to contribute an image to a mosaic image featured in a mosaic display. The user device 102 may be a stand-alone device that solely provides at least some of the functionality to enable the inclusion of the image and associated messages, or may be a multi-use device that has functionality beyond the image and message inclusion disclosed herein.

Examples of the devices 102, 106, include a personal computer, a notebook computer, a tablet computer, a netbook computer, a set-top box (STB), a receiver card, a mobile telephone, a personal digital assistant (PDA), a display device, a portable gaming unit, and a computing system; however other devices may also be used. For example, the devices 102, 106, may include a mobile electronic device, such an IPHONE or IPAD device by Apple, Inc., mobile electronic devices powered by ANDROID by Google, Inc., and a BLACKBERRY device by Research In Motion Limited. The devices 102, 106, may also include other computing devices, such as desktop computing devices, notebook computing devices, netbook computing devices, gaming devices, and the like. Other types of electronic devices may also be used. In some embodiments, the devices 102, 106 when executing the method steps described herein, are a specific machine dedicated to the present disclosure.

The network 104 by which one or more than one of the devices 102, 106, communicate may include, by way of example, Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may also include optical communications. Other conventional and/or later developed wired and wireless networks may also be used. In some embodiments, the network 104 may include proprietary network communication technologies such as secure socket layers (SSL) technology, technology found in a prescribing network (e.g., the electronic prescribing network operated by Surescripts of Arlington, Va.), and the like.

The management device 106 is a device operated by an entity at least partially responsible for rendering the mosaic image. While the entity operating the management device 106 may include, for example, a first entity operating the management device 106 for the benefit of a second entity, other entities may operate the management device 106 either on behalf of themselves, the other entity, individuals, or another entity.

The user device 102 may be in a client-server relationship with the management device 106, a peer-to-peer relationship with the management device 106, and/or in a different type of relationship with the management device 106.

The user device 102 and/or the management device 102 may be in communication directly (e.g., through local storage or peer-to-peer connection(s)) and/or through the network 104 (e.g., in a cloud configuration or software-as-a-service) with a device that stores a database 108. The database 108 may be deployed on the resource device 106, on the operator device 102, on a separate device, or may otherwise be deployed in storage devices. The database 108 may store rendering scheme data 110, organization data 112, imaging data 114, and messaging data 116.

The rendering scheme data 110 may include stored data that enables rendering of mosaic. The rendering scheme data 110 may include one or more the one mosaic rendering schemes to enable the rendering of mosaics. The rendering scheme data 110 may include computer code written in JAVASCRIPT or another computer programming or scripting language.

The organization data 112 may include stored information about an organization and/or the persons associated with the organization. The information about the organization may include organization company structure, organization reporting structure, building identification, office number, or the like. The organization data 112 associated with persons of the organization may include personal information such as name, address, ethnicity, or the like, personal background information such as previous functions or roles with the organization and prior to joining the organization, salary information, organization ranking information such as organizational position or job title, and the like.

The imaging data 114 may include stored images (e.g., as provided by users). The imaging data 114 may include one, or more than one, image provided by a single user or multiple users. Received images may be stored as provided by the user, or may be stored as modified (e.g., cropped, resized, reformatted, or otherwise). The images may be limited to a certain size, or may be acceptable at any size (e.g., until a system maximum size). The images may be stored before review, after approval, automatically upon receipt, or otherwise. In some embodiments, original versions of the images may be stored in addition to modified versions of the images. In other embodiments, only one version of the images may be stored.

The messaging data 116 may include stored messages (e.g., as provided by users). The messaging data 116 may include one, or more than one, message provided by a single user or multiple users. Received messages may be stored as provided by the user, or may be stored as modified (e.g., manually by the organization or a person associated with the organization or automatically based on system selections). The messages may be limited to a certain designated number of characters, or may be acceptable to an unlimited number of characters (e.g., until a system maximum). The messages may be stored before review, after approval, automatically upon receipt, or otherwise. In some embodiments, original versions of the messages may be stored in addition to modified versions of the messages. In other embodiments, only one version of the messages may be stored.

While the system 100 in FIG. 1 is shown to include single devices 102, 106 multiple devices may be used. The devices 102, 106 may be the same type of device or may be different device types. When multiple devices are present, the multiple devices may be of the same device type or may be a different device types. Functionality of some or all of the devices 102, 106 may be combined into a lesser number of devices, or may be spread among a greater number of devices. For example, the functionality of devices 102, 106 may be combined into a single device.

Moreover, system 100 shows a single network 104, however, multiple networks may be used. The multiple networks may communicate in series with each other to link the devices 102, 106, 108 or in parallel to link the devices 102, 106. The devices 102, 106 may be in a client-server relationship with one another, a peer-to-peer relationship with one another, in a different type of relationship with one another, or in a combination of different types of relationships with one another. The devices 102, 106, either as stand-alone or multiple connected devices, operate as specific machines when executing present method steps for as described herein.

Figure 2:
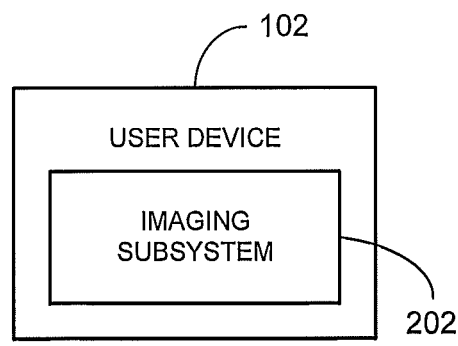
FIG. 2 is a block diagram of an example user device that may be deployed within the system of FIG. 1, according to an example embodiment.

FIG. 2 illustrates the user device 102, according to an example embodiment. The user device 102 may include an imaging subsystem 202. The imaging subsystem 202 may enable rendering of a mosaic image. The user device 102 may be deployed in the system 100, or may otherwise be used.

Figure 3:
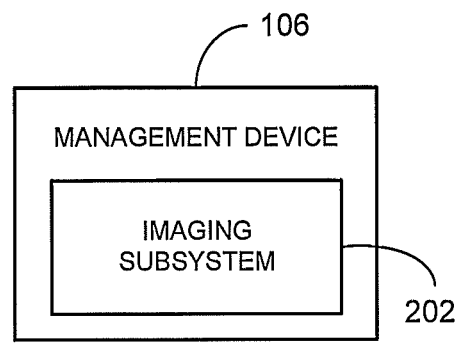
FIG. 3 is a block diagram of an example management device that may be deployed within the system of FIG. 1, according to an example embodiment.

FIG. 3 illustrates the management device 106, according to an example embodiment. The management device 106 may include an imaging subsystem 202. The imaging subsystem 202 may enable rendering of a mosaic image. The management device 106 may be deployed in the system 100, or may otherwise be used.

Figure 4:
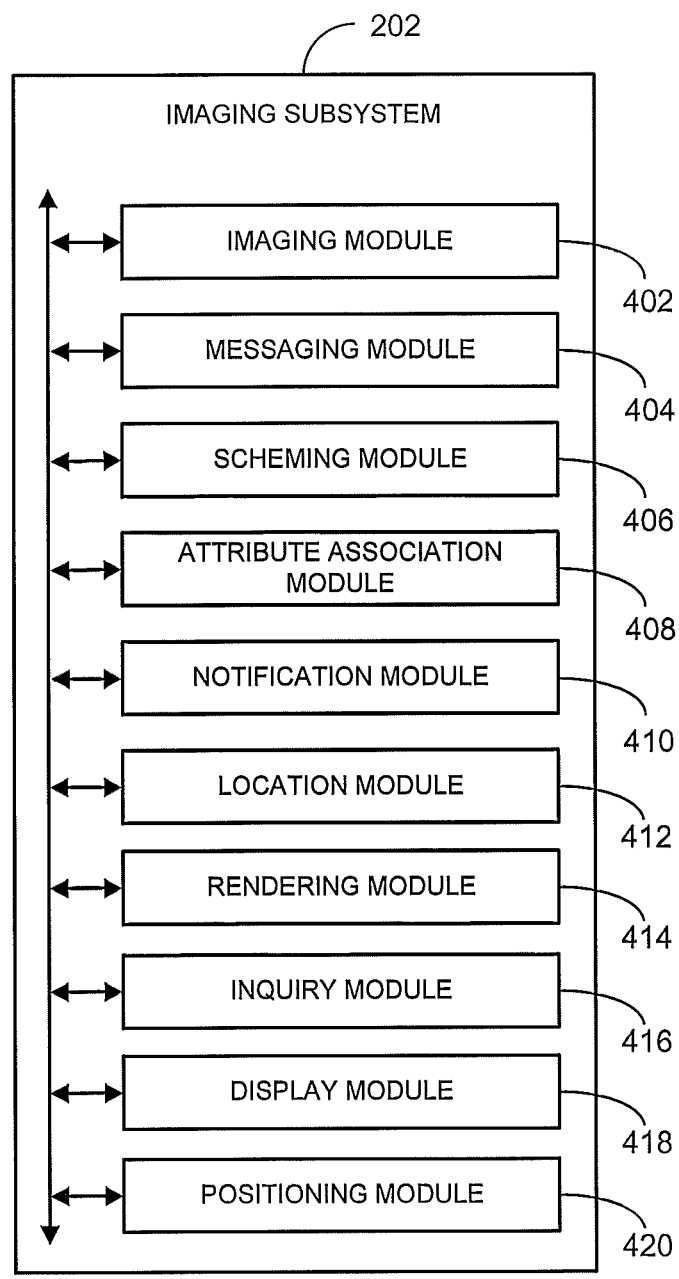
FIG. 4 is a block diagram of an example imaging subsystem that may be deployed within the user device of FIG. 2 or the management device of FIG. 3, according to an example embodiment.

FIG. 4 illustrates an example imaging subsystem 202 that may be deployed in the user device 102, the management device 106, or otherwise deployed in another system. One or more modules are communicatively coupled and included in the imaging subsystem 202 to render a mosaic. The modules of imaging subsystem 202 that may be included are an imaging module 402, a messaging module 404, a scheming module 406, an attribute association module 408, a notification module 410, a location module 412, a rendering module 414, an inquiry detection module 416, a display module 418, and a positioning module 420. Other modules may also be included.

In some embodiments, the modules of the imaging subsystem 202 may be distributed so that some of the modules are deployed in the user device 102 and some modules are deployed in the management device 106. In one embodiment, the modules are deployed in memory and executed by a processor coupled to the memory. The functionality contained within the modules 402-420 may be combined into a lesser number of modules, further divided among a greater number of modules, or redistributed among existing modules. Other configurations including the functionality of the modules 402-420 may be used.

The imaging module 402 receives, accesses, and/or stores images. In general, the image is received by the imaging module 402 due to a user wanting to submit one or more than one images for possible inclusion in a mosaic display. When multiple images are received, only one image may be used for inclusion in the mosaic, or at least a portion of the multiple images may be used. For example, a person associated with the approval of the image may select one, or more than one, of the multiple images for inclusion that we submitted by a user through the imaging module 402. The received images may be stored in the database 108 as the imaging data 116 for later access.

In general, the image to be included in the mosaic image features a person. In some embodiments, the person who is featured is the same person that submitted the image. In some embodiments, the person who submitted the image is acting on behalf of the person featured in the image. The image may only include that person, or may include one or more than one additional persons. Other items, objects, animals, scenery, or the like may also be included in the image.

In some embodiments, the image may feature something besides a person. For example, animals, food, action figures, characters, buildings, geographic locations, clothing, musical instruments, planets, and the like may be featured.

The image is generally provided in a graphic format that is capable of rendering such as GIF, JPEG, or the like. Generally, the image is an image that has already been captured. However, the imaging module 402 may include functionality to capture the image of the person.

In some embodiments, the imaging module 402 enables an image processing person such as an administrator (e.g., as may be associated with the management device 106 and/or the organization associated with the person) or otherwise to review and/or modify a received image or an accessed image (e.g., from the imaging data 114). For example, the image processing person may crop, change the image format, or otherwise edit or modify an image prior to further usage by the imaging subsystem 202. In some embodiments, the review and/or modification of the image may be performed automatically. The altered image may be stored as imaging data 114 and/or the alterations to the image may be stored as imaging data 114.

The messaging module 404 receives a message associated with the person (or whoever or whatever is featured in the image). A single message or multiple messages may be received. Generally the message is textual language used to communicate with others. In some embodiments, the message is a personal message associated with the person. For example, the personal message may be a message created by the person to characterize himself or herself. The personal message may reflect attributes about the person, interests of the person, the person's relationship with an organization, background of the person, the person's humor, or the like. In some embodiments, the personal message does not describe aspects about the image other than reflecting a personal message of the person featured in the image.

When a new mosaic is being created by the imaging subsystem 202, multiple images are received and/or accessed and utilized to render the initial mosaic. After an initial mosaic is rendered, the mosaic may be modified (e.g., re-rendered or further rendered) to accommodate additional images. In some embodiments, a mosaic rendering scheme (e.g., as stored in the scheme data 110) may define how images are assembled to render the mosaic. The mosaic rendering scheme may associate an image with a particular location (e.g., an absolute location or a relative location) in the mosaic, may define how images are associated with locations in the mosaic, or otherwise. The mosaic rendering scheme may include how much space to include on the various sides of the mosaic display, how image loading is to be handled, how scrolling is to be handled, and the like.

In some embodiments, the sequence of the image to be rendered is defined by the mosaic rendering scheme. For example, the mosaic rendering scheme may define that the images are to be rendered newest received to oldest received, oldest received to newest received, or otherwise.

In some embodiments, the mosaic rendering scheme is written in JAVASCRIPT or another computer programming or scripting language and/or utilizes one, or more than one, style sheet. For example, style sheets may be used to control location of the mosaic display in web browser while a scripting language may be used to control loading and placement of images within the mosaic display. In some embodiments, the mosaic rendering scheme includes rendering factors such as parameters, margins, web space, and placement defined for the mosaic display. The rendering factors may be defined for one or more than one screen size.

In some embodiments in which the mosaic has already be rendered or otherwise created, the scheming module 406 modifies an already existing mosaic rendering scheme to create a modified mosaic rendering scheme that includes one or more than one additional image received by the imaging module 402. In some embodiments, the additional image will not be considered for inclusion in the mosaic image unless a message is also received by the messaging module 404. The image and the message may be received simultaneously, sequentially, or otherwise.

The modification of the rendering scheme may be performed manually (e.g., by a person approving the image for inclusion), automatically (e.g., in accordance with a rendering criterion), or otherwise. For example, the scheming module 406 may modify the mosaic rendering scheme to create a modified mosaic rendering scheme that includes the received image such that the received image is adjacent to an adjacent image already included in the mosaic image that has a different person attribute associated with that person than the person attribute associated with the image. In general, the person attribute includes an ethnicity of the person, an age of the person, a position of the person relative to an organization in which the person is a member, or combinations thereof. The person attributed may be defined in the organization data 112, defined by the person submitting the image, or otherwise. Thus, the scheming module 406 may create the mosaic rendering scheme or the modified mosaic rendering scheme to reflect a diverse organization.

In certain implementations of the imaging subsystem 202, approvals may be obtained through the notification module 410 prior to inclusion of an image (and/or message) in the rendering of the mosaic image. These posting approvals may be obtained from the person, from an administrator (e.g., as may be associated with the management device 106 and/or the organization associated with the person), or otherwise. The posting approvals may be received in response to a posting request generated by the notification module 410 or otherwise.

By way of example, the notification module 410 may generate a posting approval request notification based on receipt of the image and the message and the scheming module 406 may modify a mosaic rendering scheme to create a modified mosaic rendering scheme including the image based on receipt of a posting approval associated with the image and the message.

In some embodiments, the location module 412 may select a posting location of the image with the mosaic rendering scheme. The location of an image in the mosaic image may be determined in real-time (e.g., in accordance with a location criterion or rules set), may be pre-set or pre-designated (e.g., based on a location designating by an approving person), may be selected by the user that provided the image (e.g., based on available locations), or otherwise. The location selected may be the next available location in the mosaic image, may bump an existing image to a different location (e.g., the next position in the mosaic), may replace an existing image, or otherwise. The mosaic rendering scheme may then be modified by the scheming module 406 based on the receipt of a posting approval associated with the image, the message, and selection of the posting location. The modified mosaic rendering scheme may be stored in the scheme data 110.

The collected images including any new images received may be rendered as a mosaic image featured in a mosaic display by the rendering module 414. In general, the mosaic image includes multiple images in a display pattern in which each image is adjacent to at least one other image. Each image of the mosaic may share an image boarder with the at least one other image, thereby making the collection of images appear as a single combined image or image presentation.

The mosaic display may be rendering client side, server side, or otherwise. In some embodiments, the rendering module 414 may include detecting end user web browser and device settings associated with an end user web browsing device (e.g., the user device 102), dynamically generating web browser source code based on the end user web browser and device settings and the modified mosaic rendering scheme, and transmitting the web browser source code to the end user web browsing device, the end user web browsing device capable of displaying a mosaic display including the image and a plurality of additional images based on the web browser source code, the mosaic display including the image and the plurality of additional images in a display pattern in which each image is adjacent to at least one other image. The end user web browser may include the type of web browser used. The device settings may include device type, the screen display size of the device, and the like.

In some embodiments, the rendering module 414 performs a backend load of the image and the additional images (e.g., in accordance with the modified mosaic rendering scheme) to enable rendering. In some embodiments, the rendering module 414 detects end user web browser and device settings associated with an end user web browsing device and renders the mosaic display based on the modified mosaic rendering scheme and detected end user web browser and device settings.

The rendering module 414 may perform operations beyond rendering the mosaic image. In some embodiments, the rendering module 414 generates a dynamically-sized campaign messaging image including a campaign message. The dynamically-sized campaign messaging image may be dynamically-sized for a person viewable window (e.g., on the user device). The mosaic display may then further include the campaign messaging image in addition to the mosaic image.

In some embodiments, the rendering performed by the rendering module 414 includes overlaying a messaging identifier on the image to identify the image as being associated with messaging. The mosaic display may then include the messaging identifier overlaying the image of the mosaic image.

In some embodiments, the rendering module 414 formats the image to create a formatted image. The mosaic display may then include the formatted image as part of the mosaic image. In some embodiments, formatting the image includes resizing the image to meet an imaging guideline thereby creating a resized image. The mosaic image may then include the resized image.

In some embodiments, the resized image has about the same dimensions as at least some of the additional images. In some embodiments, formatting the image includes cropping the image to meet an imaging guideline (e.g., as may be established by the organization) thereby creating a cropped image. The cropped image may include at least a face of the person. The mosaic display may then include the cropped image.

In some embodiments, person approval is received by the notification module 410 from the person to post the image and the message. The mosaic image is then rendered by the rendering module 414 based on the modified mosaic rendering scheme and receipt of the person approval.

In some embodiments, an administrative approval is received by the notification module 410 from an administrator of the person to post the image and the message. The mosaic image is then rendered by the rending module 414 based on the modified mosaic rendering scheme and receipt of the administrative approval.

The inquiry detection module 416 detects a user inquiry relative to the mosaic display in proximity to the image. For example, the inquiry detection module 416 may determine that a user is "mousing over" a particular image tile of the mosaic display. In some embodiments, detection of the user inquiry includes determining that a user-directed interface is in proximity to the image rendered as part of the mosaic image. Generation of the message display may then include the message based on a determination that the user-directed interface is in proximity.

The display module 418 generates a message display including the message based on detection of the user inquiry. The message display may be in the form of a pop-up window, an overlapping image portion, or otherwise. In some embodiments, the message display is generated with JAVASCRIPT or another computer programming or scripting language. In some embodiments, JAVASCRIPT JQuery Lazy Load plugin may be used to allow the images of the mosaic display to appear as the user is scrolling the screen.

In some embodiments, the message displays associated with all images are generated prior to detection of the user inquiry by the display module 418. The message display associated with the detection is then revealed based on detection. In other embodiments, the message is generated in response to detection of the inquiry.

In some embodiments, the scheming module 406 determines a position with which the image is associated in the mosaic rendering scheme. Generation of the message display by the display module 418 may then be based on detection of the user inquiry and a determination of the position.

In some embodiments, the message display includes a person identifier to reflect detection of the user inquiry and association of the message with the image. The display module 418 may remove the overlay of the message identifier based on detection of the user inquiry and overlaying the person identifier based on detection of the user inquiry.

In some embodiments, the positioning module 420 may determining a relative positioning of the image in the mosaic display as rendered by the end user web browser on the end user web browsing device and the display module 418 may then generate a message display including the message based on detection of the user inquiry and a determination of the relative positioning of the image in the mosaic display. The positioning module 420 may position the message display relative to the image in a number of different ways including above the image, below the image, to the right of the image, to the left of the image, or otherwise.

In some embodiments, the positioning module 420 may position the message display relative to the image based on the location of the image within the mosaic display and the size of the screen used to view the mosaic display. For example, the positioning module 420 may position the message display below the image unless the screen used to view the mosaic display would cut off the message display. In such instances, the message display may be positioned above the image.

In some embodiments, the rendering module 414 may utilize only a portion of all of the images available to render the display mosaic. As the positioning module 420 detects scrolling in the web browser of the user, additional images may be rendered by the rendering module 414. For example, the rendering module 414 may render seventy-two images as the display mosaic. As the positioning module detects sufficient scrolling with the web browser relative to the display mosaic, the display mosaic may be re-rendered and/or further rendered to present an additional seventy-two images. A greater number or lesser number of images (e.g., 30, 50, 70, 90, 110) may be used in the original rendering, the re-rendering, and/or the further rendering. In some embodiments, the foregoing processing may reduce the possibility of the web page containing the mosaic display from freezing due to attempting to render too many images as part of the mosaic display.

In some embodiments, an image featuring a person is received by the imaging module 402. A message associated with the person is received by the messaging module 404. The attribute association module 408 associates a person attribute to the image. The rendering module 414 then renders a mosaic image including the image and additional images based on association of the person attribute to the image. The mosaic image includes the image and the additional images in a display pattern in which each image is adjacent to at least one other image, the image being adjacent to an adjacent image that has a different person attribute associated than the person attribute associated with the image. The inquiry module 416 detects a user inquiry relative to the mosaic image in proximity to the image. The display module 418 then generates a message display including the message based on detection of the user inquiry.

Figure 5:
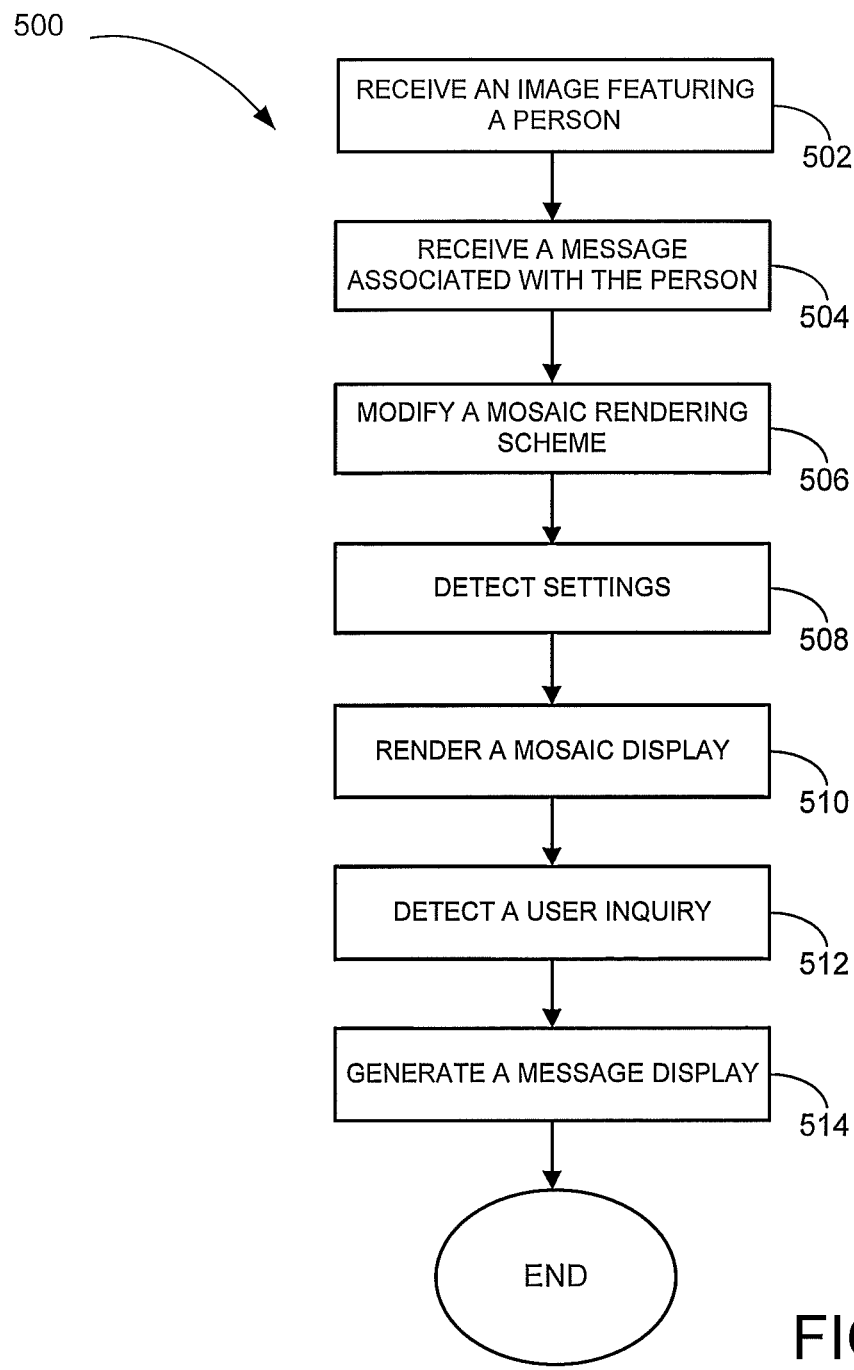
FIGS. 5 and 6 are block diagram of flowcharts illustrating a method for mosaic rendering, according to example embodiments.

FIG. 5 illustrates a method 500 for mosaic rendering, according to an example embodiment. The method 500 may be performed by the user device 102, the management device 106, partially by the user device 102 and partially by the the management device 106, or may be otherwise performed.

An image featuring a person is received at block 502. A message associated with the person is received at block 504. A single message or multiple messages may be received. In some embodiments, the image and the associated message or messages may be received through a web-based submission form.

A mosaic rendering scheme is modified at block 506 to create a modified mosaic rendering scheme including the image based on receipt of the image and the message.

In some embodiments, a person attribute is associated to the image. The person attribute may include an ethnicity of the person, an age of the person, a position of the person relative to an organization in which the person is a member, or the like. Modification of the mosaic rendering scheme may then based on receipt of the image and the message and association of the person attribute to the image.

In some embodiments, modifying the mosaic rendering scheme includes modifying the mosaic rendering scheme to create a modified mosaic rendering scheme including the image such that the image is adjacent to an adjacent image that has a different person attribute associated than the person attribute associated with the image.

In some embodiments, a posting approval request notification is generated based on receipt of the image and the message and modification of a mosaic rendering scheme to create a modified mosaic rendering scheme including the image based on receipt of a posting approval associated with the image and the message is performed.

In some embodiments, a posting location of the image with the mosaic rendering scheme is selection. Modification of the mosaic rendering scheme is based on the receipt of a posting approval associated with the image, the message, and selection of the posting location.

End user web browser and device settings associated with an end user web browsing device may be detected at block 508. At block 510, a mosaic image including the image and additional images is rendered based on the modified mosaic rendering scheme and/or and detected end user web browser and device settings. The mosaic image includes the image and the additional images in a display pattern in which each image is adjacent to at least one other image. In some embodiments, each image shares an image boarder with the at least one other image.

In some embodiments, the mosaic image may not be rendered with the image unless one, or more than one, approval is received. For example, a person approval may be received from the person to post the image and the message and/or an administrative approval may be received from an administrator of the person to post the image and the message. Rendering of the mosaic image is then based on the modified mosaic rendering scheme and receipt of the person approval and/or the administrative approval.

In some embodiments, rendering includes formatting the image to create a formatted image. The mosaic image may then include the formatted image.

Formatting the image may include cropping the image to meet an imaging guideline thereby creating a cropped image. The cropped image may include at least a face of the person. The mosaic image may then include the cropped image.

Formatting the image may include resizing the image to meet an imaging guideline thereby creating a resized image. The mosaic image may then include the resized image. In some embodiments, the resized image has about the same dimensions as at least some of the additional images.

In some embodiments, rendering includes generating a dynamically-sized campaign messaging image including a campaign message. In general, the dynamically-sized campaign messaging image is dynamically-sized for a person viewable window. The mosaic display may then include the campaign messaging image and the mosaic image.

In some embodiments, rendering includes overlaying a messaging identifier on the image to identify the image as being associated with messaging. The mosaic display may then include the messaging identifier overlaying the image of the mosaic image.

A user inquiry relative to the mosaic display in proximity to the image is detected at block 512. In some embodiments, detection of the user inquiry includes determining that a user-directed interface is in proximity to the image rendered as part of the mosaic display.

A message display including the message is generated at block 514 based on detection of the user inquiry. In some embodiments, a position with which the image is associated in the mosaic rendering scheme is determined and generation of the message display is based on detection of the user inquiry and a determination of the position.

The message display may include a person identifier to reflect detection of the user inquiry and association of the message with the image. In some embodiments, the overlay of the message identifier may be removed based on detection of the user inquiry and overlaying the person identifier based on detection of the user inquiry.

In some embodiments, generation of the message display including the message is based on a determination that the user-directed interface is in proximity.

Figure 6:
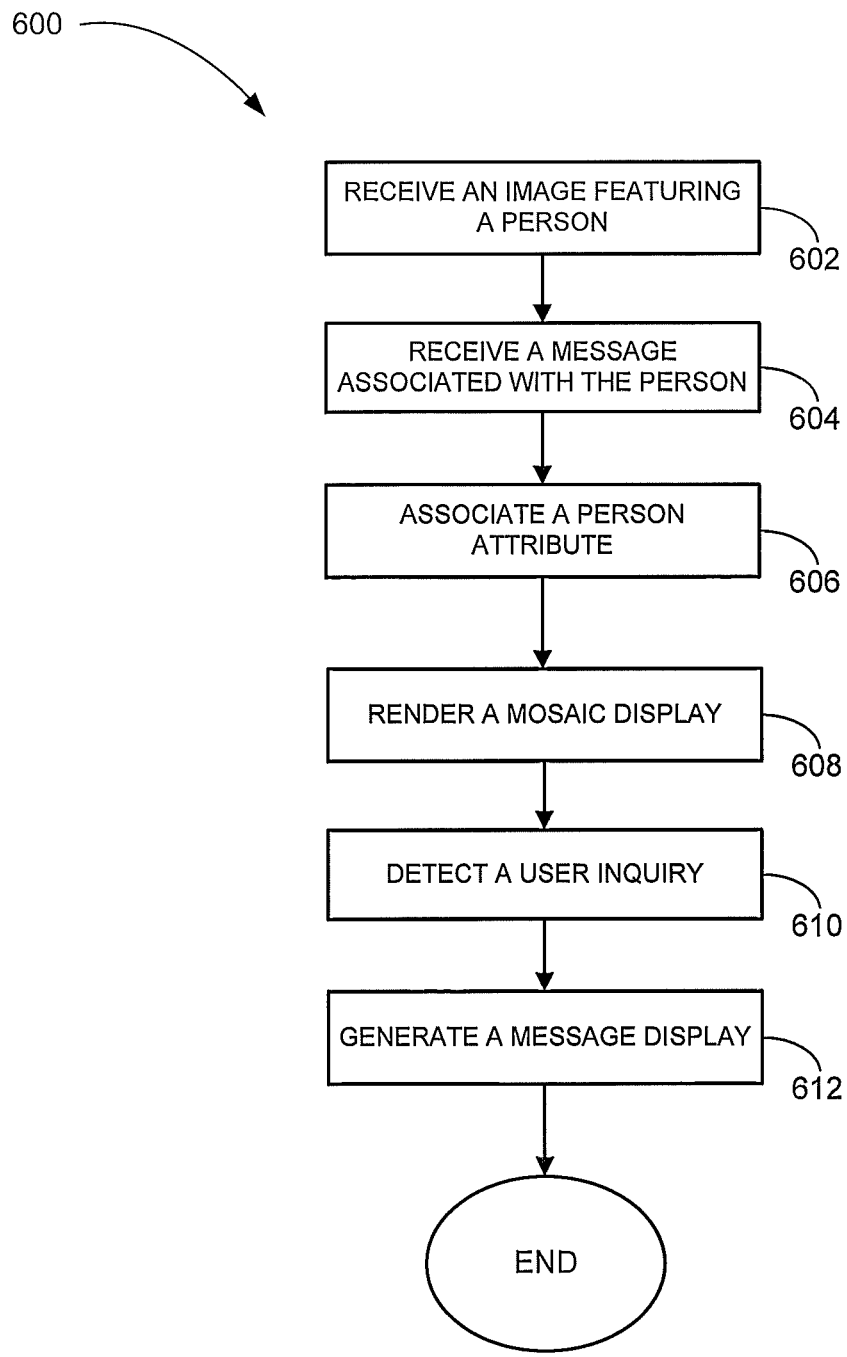

FIG. 6 illustrates a method 600 for mosaic rendering, according to an example embodiment. The method 500 may be performed by the user device 102, the management device 106, partially by the user device 102 and partially by the the management device 106, or may be otherwise performed.

An image featuring a person is received at block 602.

A message associated with the person is received at block 604.

A person attribute may be associated with the image at block 606.

A mosaic display including a mosaic image is rendered at block 608 including the image and the additional images based on association of the person attribute to the image. The mosaic image may include the image and additional images in a display pattern in which each image is adjacent to at least one other image. The image may be adjacent to an adjacent image that has a different person attribute associated than the person attribute associated with the image.

A user inquiry is detected at block 610 relative to the mosaic display in proximity to the image.

A message display including the message is generated at block 612 based on detection of the user inquiry. In some embodiments, a position with which the image is associated is determinate and generation of the message display is based on detection of the user inquiry and a determination of the position.

FIGS. 7-11 are example displays 700-1100, according to example embodiments. The displays 700-1000 include example images and a mosaic display may be generated by the imaging subsystem 202 and ultimately presented to a device operator of the user device 102 and/or another other operator of a different device. However, other types of displays and modification to the displays 700-1000 may additionally or alternatively be presented.

Figure 7:
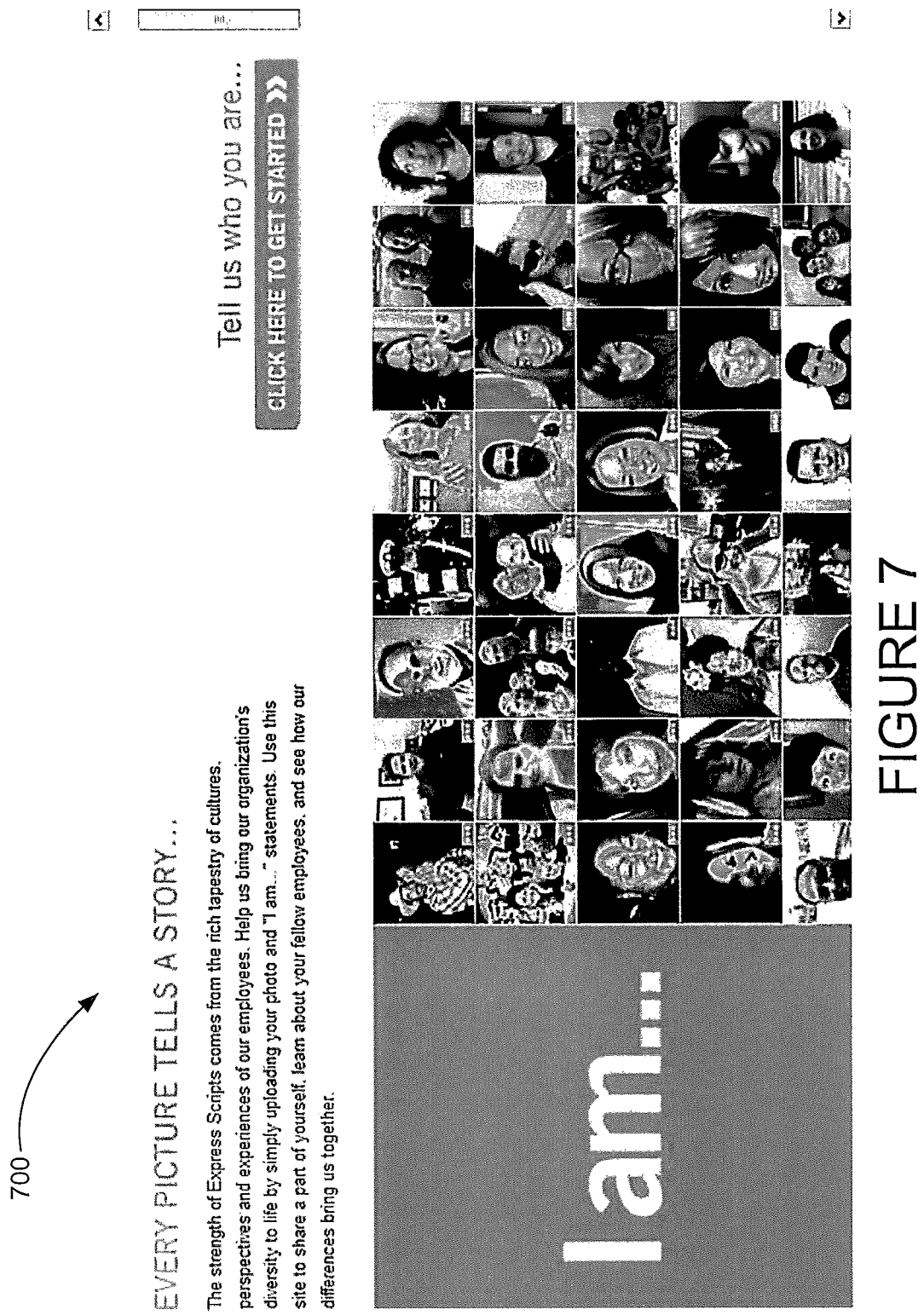

FIG. 7 show a display 700 that includes a portion of a mosaic display in which 40 images are shown. While only a portion of the mosaic image is shown in the mosaic display, the entire mosaic image may be shown in other embodiments. Additional or lesser number of images may be included horizontally and/or vertically in the displayed portion of the mosaic display. The images included in the displayed portion include a messaging identifier that overlays the images to identify them as being associated with messaging.

As shown, a dynamically-sized campaign messaging image is included that features a campaign message. The dynamically-sized campaign messaging image may be sized based on the portion of the mosaic display rendered for the viewer. The campaign message included in the display 700 is "I am". However, other campaign messages may be used. In addition to the mosaic display featuring the images, company text and branding may also be included.

Figure 8:

FIG. 8 shows a display 800 that includes the portion of a mosaic display shown in display 700 after an image has been selected. The image may be selected by clicking on an image, hovering over an image, or otherwise. With the selection, a message display is shown in associated with the image. In this example, the message display included three messages reflecting that the person featured in the image reflects that she is "addicted to soda, a mom to two boys, and a crossfitter". However, other numbers of messages and types of messages may be used.

Figure 9:
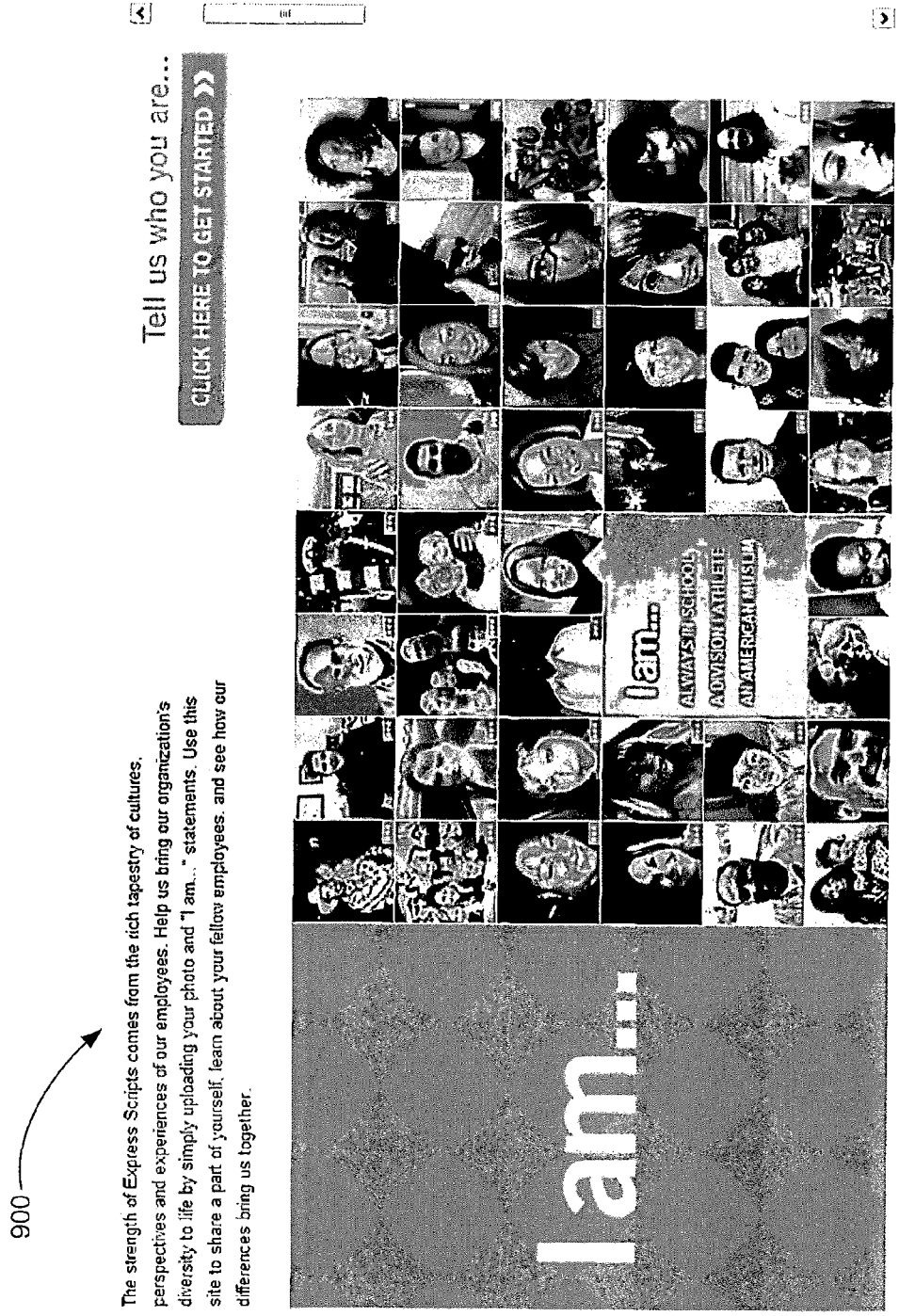

FIG. 9 shows a display 900 that includes the portion of a mosaic display shown in display 700 after a different image has been selected then the selected image of display 800. In this example, the message display included three messages reflecting that the person featured in the image reflects that she is "always in school, a division I athlete, and an American Muslim". The message display in display 900 is in a different position relative to the image than the display 800.

Figure 10:
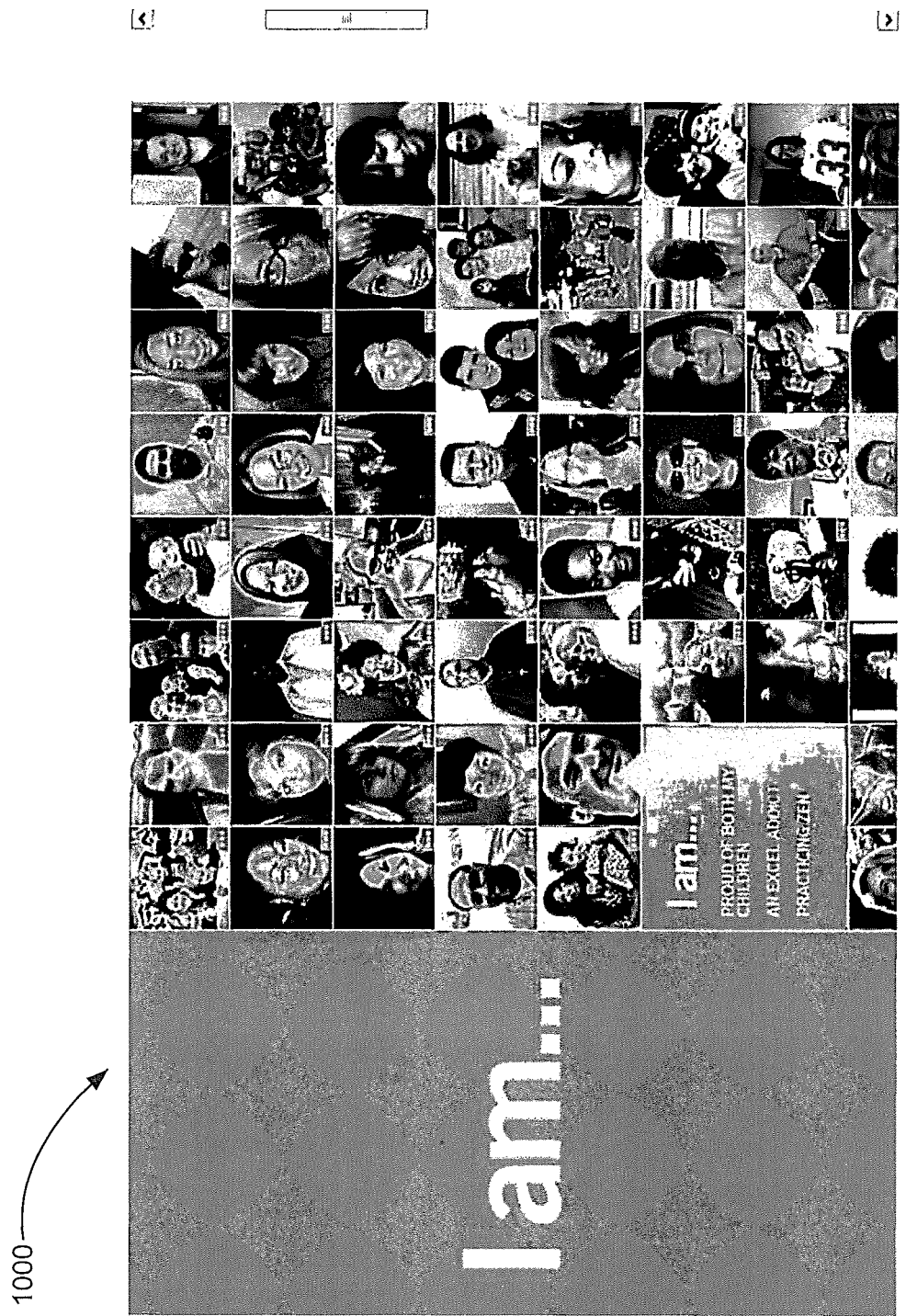

FIG. 10 shows a display 1000 after scrolling that includes a different portion of a mosaic display shown in displays 700-900. The display 1000 shows selection of a different image and the message display including the messages associated with the image.

Figure 11:
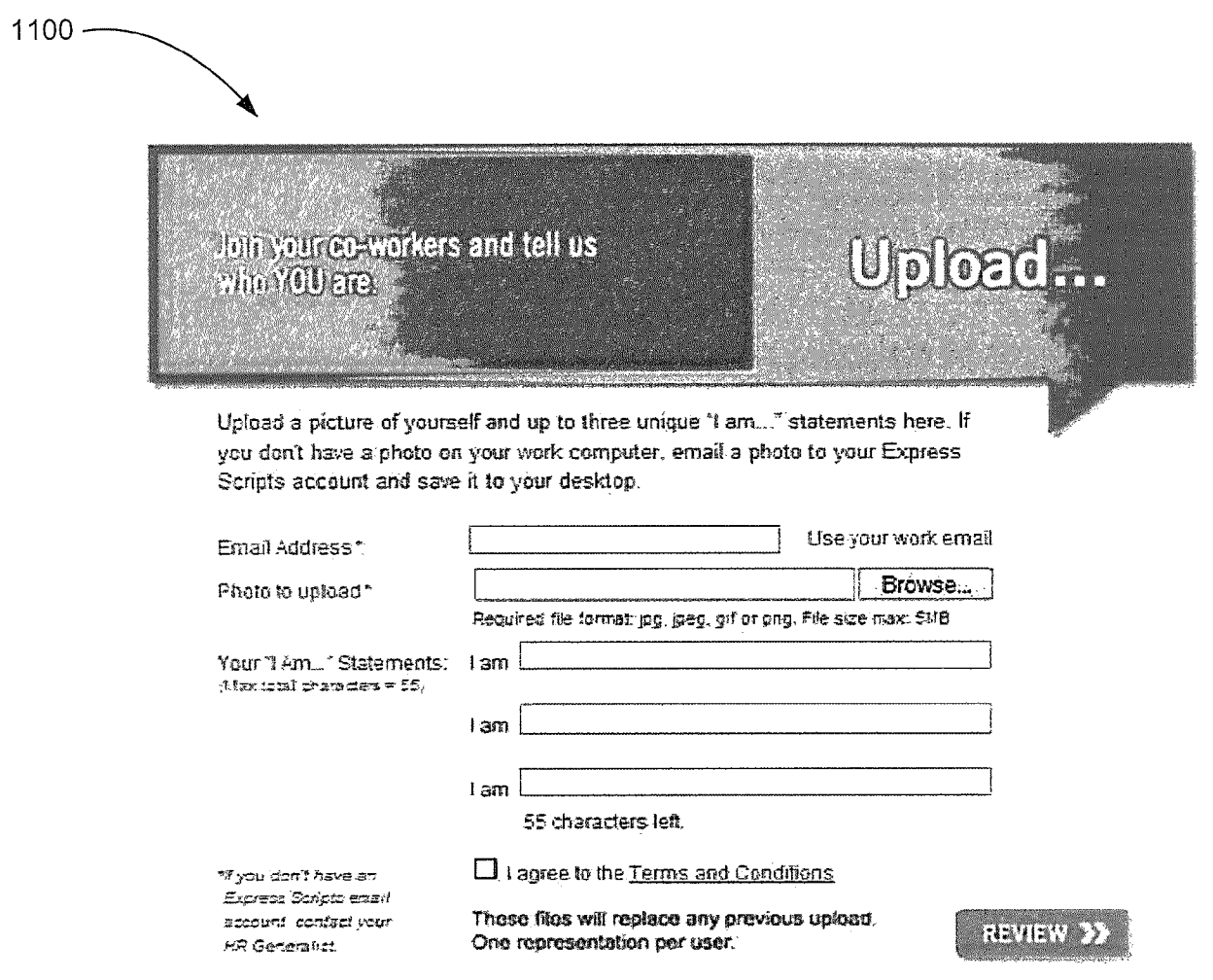

FIG. 11 shows a display 1100 in which a user is directed to provide certain information so as to be included or considered for inclusion in a mosaic display. The display 1100 may include a field to enable the user to upload an image for inclusion or possible inclusion in the mosaic display. The user may be directed on certain limitations associated with the image such as image size, image format, or the like.

The display 1100 may have a field that enables the user to provide personally identifying information such as an e-mail address. Other type of user information may also be collected including, by way of example, first name, last name, address, zip code, company or organization association, position within the company or organization, ethnicity, age, interests, or the like.

The display 1100 may have a field that enables the user to provide a message. A single message or multiple messages may be provided by the user. The display 1100 may include a static number of messaging fields or a dynamic number of messaging fields. While three messaging fields are show, more or less fields may be used. Campaign related information may also be included on the display 1100.

Figure 12:
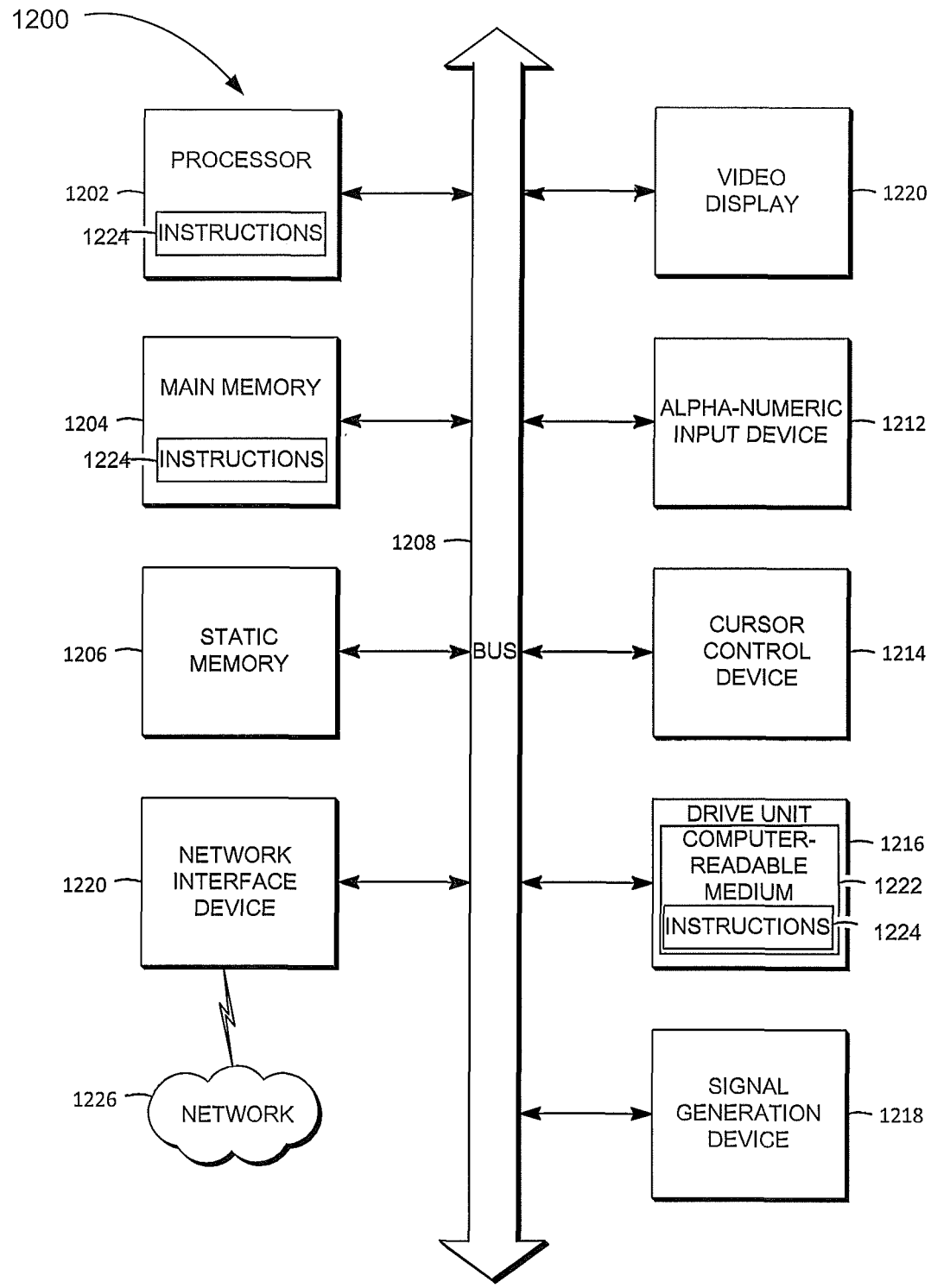
FIG. 12 is a block diagram of a machine in the example form of a computer system within which a set of instructions for causing the machine to perform any one or more of the methodologies discussed herein may be executed or stored.

FIG. 12 shows a block diagram of a machine in the example form of a computer system 1200 within which a set of instructions may be executed causing the machine to perform any one or more of the methods, processes, operations, or methodologies discussed herein. The user device 102 and/or the management device 106 may include the functionality of the one or more computer systems 1200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1212 (e.g., a central processing unit (CPU) a graphics processing unit (GPU) or both), a main memory 1204 and a static memory 1206, which communicate with each other via a bus 1208. The computer system 1200 further includes a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a drive unit 1216, a signal generation device 1218 (e.g., a speaker) and a network interface device 1220.

The drive unit 1216 includes a computer-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1212 during execution thereof by the computer system 1200, the main memory 1204 and the processor 1212 also constituting computer-readable media.

The software 1224 may further be transmitted or received over a network 1226 via the network interface device 1220.

While the computer-readable medium 1222 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, an image featuring a person is received. A message associated with the person is received. A mosaic rendering scheme is modified to create a modified mosaic rendering scheme including the image based on receipt of the image and the message. A mosaic display is rendered including the image and the plurality of additional images based on the modified mosaic rendering scheme, the mosaic display including the image and the plurality of additional images in a display pattern in which each image is adjacent to at least one other image. A user inquiry is detected relative to the mosaic display in proximity to the image. A message display is generated including the message based on detection of the user inquiry.

In an example embodiment, an image featuring a person is received. A message associated with the person is received. A person attribute is associated with the image. A mosaic display including the image and the plurality of additional images is rendered based on association of the person attribute to the image, the mosaic display including the image and the plurality of additional images in a display pattern in which each image is adjacent to at least one other image, the image being adjacent to an adjacent image that has a different person attribute associated than the person attribute associated with the image. A user inquiry is detected relative to the mosaic display in proximity to the image. A message display including the message is generated based on detection of the user inquiry.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, "a" or "an" may reflect a single part or multiple parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. Thus, systems and methods for pharmacy messaging have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
receiving, on a computer processor, an image featuring a person and a message associated with the person;
modifying, on the computer processor, a mosaic rendering scheme to create a modified mosaic rendering scheme including the image based on receipt of the image and the message;
detecting, on the computer processor, end user web browser and device settings associated with an end user web browsing device;
rendering, on the computer processor, a mosaic display including the image and a plurality of additional images based on the modified mosaic rendering scheme and detected end user web browser and device settings, the mosaic display including the image and the plurality of additional images in a display pattern formatted for the end user web browser and end user web browsing device in which each image is adjacent to at least one other image;
detecting, on the computer processor, an event when a user inquiry relative to the mosaic display is in proximity to the image, the user inquiry being a user-directed interface;
determining, on the computer processor, a relative positioning of the image in the mosaic display as rendered by the end user web browser on the end user web browsing device; and
generating, on the computer processor, a message display including the message associated with the person based on detection of the user inquiry and a determination of the relative positioning of the image in the mosaic display, the message associated with the person being a textual personal message characterizing the person of the image,
wherein the message display, when displayed, conceals n images of the plurality of additional images adjacent to the relative positioning of the image in the mosaic display in response to detecting the event, and
wherein the message display, when displayed, is positioned adjacent to one of a plurality of edges of the image based on the relative positioning of the image in the mosaic display such that the message display is completely displayed within the end user web browser on the end user web browsing device.

2. The method of claim 1, wherein rendering includes:
generating a dynamically-sized campaign messaging image including a campaign message, the dynamically-sized campaign messaging image being dynamically-sized for a person viewable window, the mosaic display further including the campaign messaging image.

3. The method of claim 1, wherein rendering includes:
overlaying a messaging identifier on the image to identify the image as being associated with messaging, the mosaic display including the messaging identifier overlaying the image.

4. The method of claim 1, wherein the message display includes a person identifier to reflect detection of the user inquiry and association of the message with the image.

5. The method of claim 4, further comprising:
removing the overlay of the messaging identifier based on detection of the user inquiry; and
overlaying the person identifier based on detection of the user inquiry.

6. The method of claim 1, further comprising:
associating a person attribute to the image,
wherein modification of the mosaic rendering scheme is based on receipt of the image and the message and association of the person attribute with the image.

7. The method of claim 6, wherein the person attribute includes an ethnicity of the person, an age of the person, a position of the person relative to an organization in which the person is a member, or combinations thereof.

8. The method of claim 1, wherein modifying the mosaic rendering scheme comprises: modifying the mosaic rendering scheme to create a modified mosaic rendering scheme including the image such that the image is adjacent to an adjacent image that has a different person attribute associated than the person attribute associated with the image.

9. The method of claim 1, further comprising:
generating, on the computer processor, a posting approval request notification based on receipt of the image and the message; and
modifying, on the computer processor, a mosaic rendering scheme to create a modified mosaic rendering scheme including the image based on receipt of a posting approval associated with the image and the message.

10. The method of claim 1, wherein detection of the user inquiry comprises:
determining that a user-directed interface is in proximity to the image rendered as part of the mosaic display,
wherein generation of the message display including the message is based on a determination that the user-directed interface is in proximity.

11. The method of claim 1, further comprising:
selecting a posting location of the image with the mosaic rendering scheme,
wherein modifying the mosaic rendering scheme is based on the receipt of a posting approval associated with the image, the message, and selection of the posting location.

12. The method of claim 1, further comprising:
receiving an additional message associated with the person,
wherein the message display includes the message and the additional message based on detection of the user inquiry.

13. The method of claim 1, further comprising:
receiving person approval from the person to post the image and the message,
wherein rendering of the mosaic display is based on the modified mosaic rendering scheme and receipt of the person approval.

14. The method of claim 1, further comprising:
receiving an administrative approval from an administrator of the person to post the image and the message,
wherein rendering of the mosaic display is based on the modified mosaic rendering scheme and receipt of the administrative approval.

15. The method of claim 1, wherein rendering comprises:
formatting the image to create a formatted image; and
wherein the mosaic display includes the formatted image.

16. The method of claim 15, wherein formatting the image comprises:
resizing the image to meet an imaging guideline thereby creating a resized image,
wherein the mosaic display includes the resized image.

17. The method of claim 16, wherein the resized image has about the same dimensions as at least some of the plurality of additional images.

18. The method of claim 15, wherein formatting the image comprises:
cropping the image to meet an imaging guideline thereby creating a cropped image, the cropped image including at least a face of the person,
wherein the mosaic display includes the cropped image.

19. The method of claim 1, wherein each image shares an image border with the at least one other image.

20. A method comprising:
receiving, on a computer processor, an image featuring a person and a message associated with the person;
associating a person attribute to the image,
rendering, on the computer processor, a mosaic display including the image and a plurality of additional images based on association of the person attribute to the image, the mosaic display including the image and the plurality of additional images in a display pattern in which each image is adjacent to at least one other image, the image being adjacent to an adjacent image that has a different person attribute associated than the person attribute associated with the image;
detecting, on the computer processor, an event when a user inquiry relative to the mosaic display is in proximity to the image, the user inquiry being a user-directed interface;
determining, on the computer processor, a relative positioning of the image in the mosaic display as rendered by an end user web browser on an end user web browsing device; and and
generating, on the computer processor, a message display including the message associated with the person based on detection of the user inquiry, the message associated with the person being a textual personal message characterizing the person of the image,
wherein the message display, when displayed, conceals n images of the plurality of additional images adjacent to the image in the mosaic display in response to detecting the event, and
wherein the message display, when displayed, is positioned adjacent to one of a plurality of edges of the image based on the relative positioning of the image in the mosaic display such that the message display is completely displayed within the end user web browser on the end user web browsing device.

* * * * *